United States Patent [19]

Satomura

[11] Patent Number: 5,175,655
[45] Date of Patent: Dec. 29, 1992

[54] METHOD AND APPARATUS FOR VERIFYING A SIGNAL RECORDED IN AN ENCODED FORM ON A MEDIUM

[75] Inventor: Seiichiro Satomura, Kawasaki, Japan

[73] Assignee: Canon Kabushiki Kaisha, Tokyo, Japan

[21] Appl. No.: 550,954

[22] Filed: Jul. 11, 1990

[30] Foreign Application Priority Data

Jul. 17, 1989 [JP] Japan .................................. 1-182572
Aug. 30, 1989 [JP] Japan .................................. 1-221647
Jun. 27, 1990 [JP] Japan .................................. 2-166854

[51] Int. Cl.⁵ .................... G11B 27/30; G11B 27/36
[52] U.S. Cl. ......................................................... 360/53
[58] Field of Search ...................................... 360/53, 31

[56] References Cited

U.S. PATENT DOCUMENTS

| | | | |
|---|---|---|---|
| 4,415,938 | 11/1983 | Heitmann | 360/53 |
| 4,740,942 | 4/1988 | Ogino et al. | 360/31 |
| 4,764,915 | 8/1988 | Efron et al. | 360/53 |
| 4,953,161 | 8/1990 | Toyama | 360/53 |

Primary Examiner—David J. Severin
Attorney, Agent, or Firm—Fitzpatrick, Cella, Harper & Scinto

[57] ABSTRACT

In method and apparatus for recording information, an information signal to be recorded is encoded, the enclosed signal is stored in a memory and also recorded on a recording medium, the signal recorded on the medium is read, and the read signal is compared with the signal stored in the memory to detect a recording error.

21 Claims, 8 Drawing Sheets

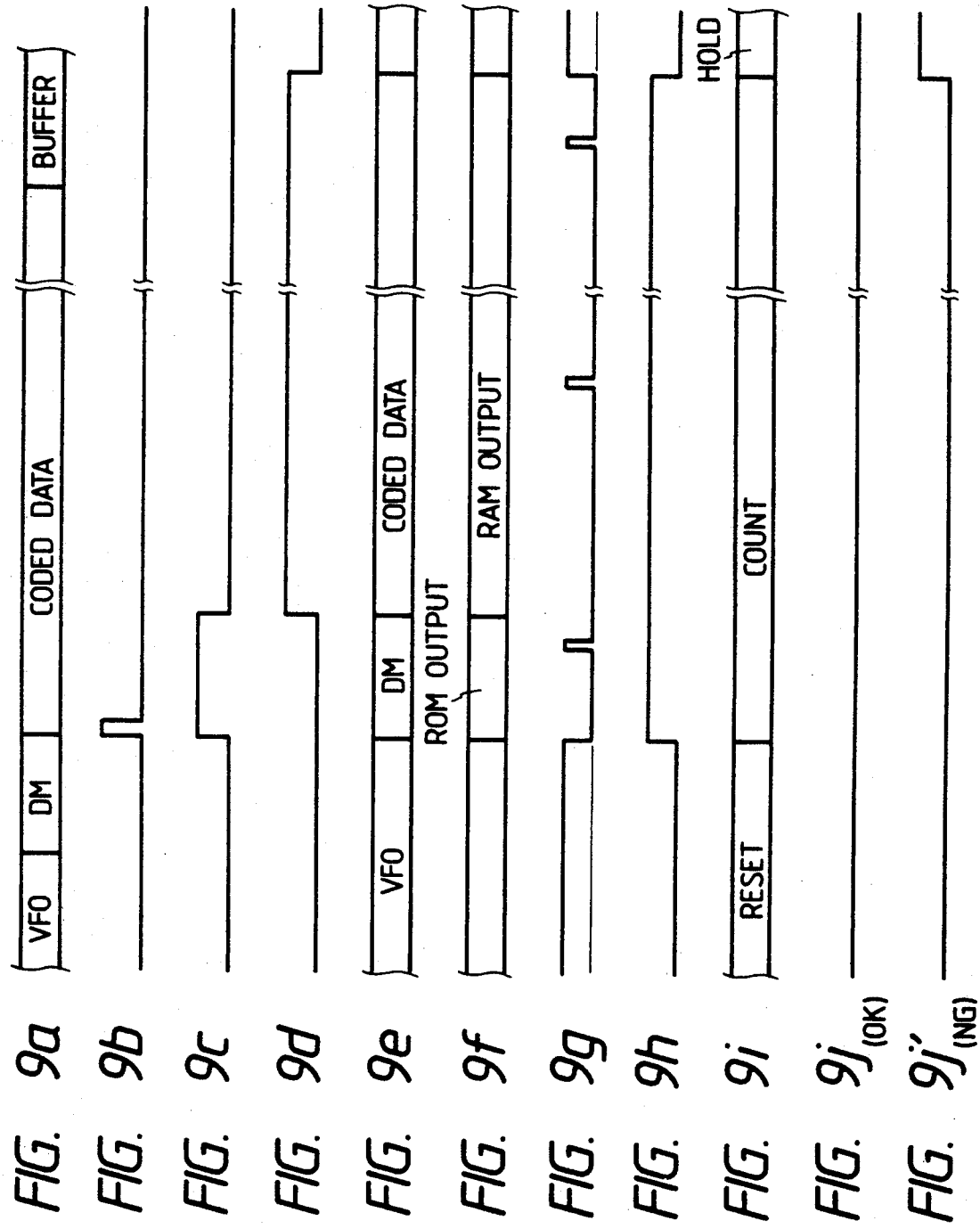

METHOD AND APPARATUS FOR VERIFYING A SIGNAL RECORDED IN AN ENCODED FORM ON A MEDIUM

BACKGROUND OF THE INVENTION

1. Field of the Invention

The present invention relates to a method and apparatus for recording information on a recording medium such as tape, disk or card and verifying the recorded information.

2. Related Background Art

In a prior art information recording apparatus, a verification operation to check whether correct recording has been done is commonly carried out. FIG. 1 shows an example of such a prior art information recording apparatus which verifies the recorded information.

In FIG. 1, numeral 1 denotes a drive controller, numeral 2 denotes a system controller, and numeral 9 denotes an error correction code (ECC) circuit. When a command to record information is sent from a host computer (not shown), the system controller 2 issues a command to the drive controller 1 to start the system. Data to be recorded, which has been sent from the host computer, has an ECC added thereto by the ECC circuit 9 and the resulting data is sent to an encoder 3. The data from the ECC circuit 9 is temporarily stored in a verification memory 10. The data supplied to the encoder 3 is sent to a recording transducer 4 as an encoded signal and recorded on a recording medium 5.

The signal recorded on the medium 5 is read by a reproducing transducer 6 and is sent to a decoder 8, which reproduces data from the signal. The reproduced data is compared with the data stored in the memory 10 by the system controller 2. When those data are equal, it is determined that the recording has been done correctly.

However, in the above prior art apparatus, because the read signal is supplied to the decoder for verification, depending on an error pattern and a characteristic of the decoder, an recording error may not be detected.

For example, let us consider a case where a 2-7 code proposed in U.S. Pat. No. 4,115,768 is used for encoding. FIG. 2 shows a conceptual view of a 2-7 code decoder. It is assumed that a correct signal "10001000" is input to a shift register 15 of the decoder as input data X. The signal is decoded by an arithmetic and logic circuit 16, a flip-flop 17 and a frequency divider 18 and a signal "1111" is produced as decoded data Y. On the other hand, if the input data is modified to "10101000" by an extra pulse generated by a defect on the medium, the decoded data is again "1111". The pattern "10101000" cannot exist in the 2-7 cord and is clearly a recording error. However, the signal produced by the decoder is same as that for the correct input signal, and the verification result shows no error. The recorded data which was misverified increases the number of errors as time elapses, and when it is to be reproduced later, the errors exceed an error correction ability, and reproduction may not be attained.

In the information recording apparatus described above, a synchronization pattern is usually added to the data to be recorded, and they are recorded on the medium. The synchronization pattern is used for synchronization during the reproduction of the data, and includes a PLL (phase locked loop) pull-in pattern for starting a PLL which generates a reference clock, a data mark (DM) for locating a start position of the data and a resynchronization pattern for correcting a shift of the clock. FIG. 3 shows an example of data having the PLL pull-in pattern and the DM pattern added thereto.

If an error is included in the synchronization pattern, the data cannot be reproduced. Accordingly, the synchronization pattern should be correctly recorded. However, in the prior art apparatus, the synchronization pattern is not directly verified but only whether the reproduction of the data by using the recorded synchronization pattern can be attained or not, is checked. Accordingly, even if the degree of errors in the synchronization pattern is low enough to permit the reproduction of the data at the time of verification, the errors may increase as time elapses and reproduction may not be attained later.

SUMMARY OF THE INVENTION

It is an object of the present invention to provide method and apparatus for recording information with severe verification of a recorded signal to prevent error in or failure of reproduction of the recorded information from occurring later.

The above object of the present invention is achieved by a method for recording information comprising the steps of:

encoding an information signal to be recorded;

storing an encoded signal in a memory;

recording the encoded signal on a recording medium;

reading the signal on the recording medium; and comparing the read signal with the signal stored in the memory to detect a recording error.

An apparatus for implementing the above method comprises:

an encoder for encoding an information signal to be recorded;

a memory for storing an encoded signal;

a recording transducer for recording the encoded signal on a recording medium;

a reproducing transducer for reading the signal recorded on the recording medium; and an error detection circuit for comparing the signal read by the reproducing transducer with the signal stored in the memory to detect a recording error.

Another method for achieving the above object comprises the steps of:

adding a synchronization signal having a predetermined pattern to an information signal to be recorded;

recording the signal having the synchronization signal added thereto on a recording medium;

reading the signal recorded on the recording medium; and comparing the synchronization signal portion of the read signal with the predetermined pattern to detect a recording error.

Another embodiment of the invention recording apparatus of the present invention comprises:

a recording transducer for recording an information signal having a synchronization signal of a predetermined pattern added thereto on a recording medium;

a reproducing transducer for reading the signal recorded on the recording medium; and an error detection circuit for comparing a synchronization signal portion of the signal read by the reproducing transducer with the predetermined pattern to detect a recording error.

DESCRIPTION OF THE PREFERRED EMBODIMENTS

Figure 1:
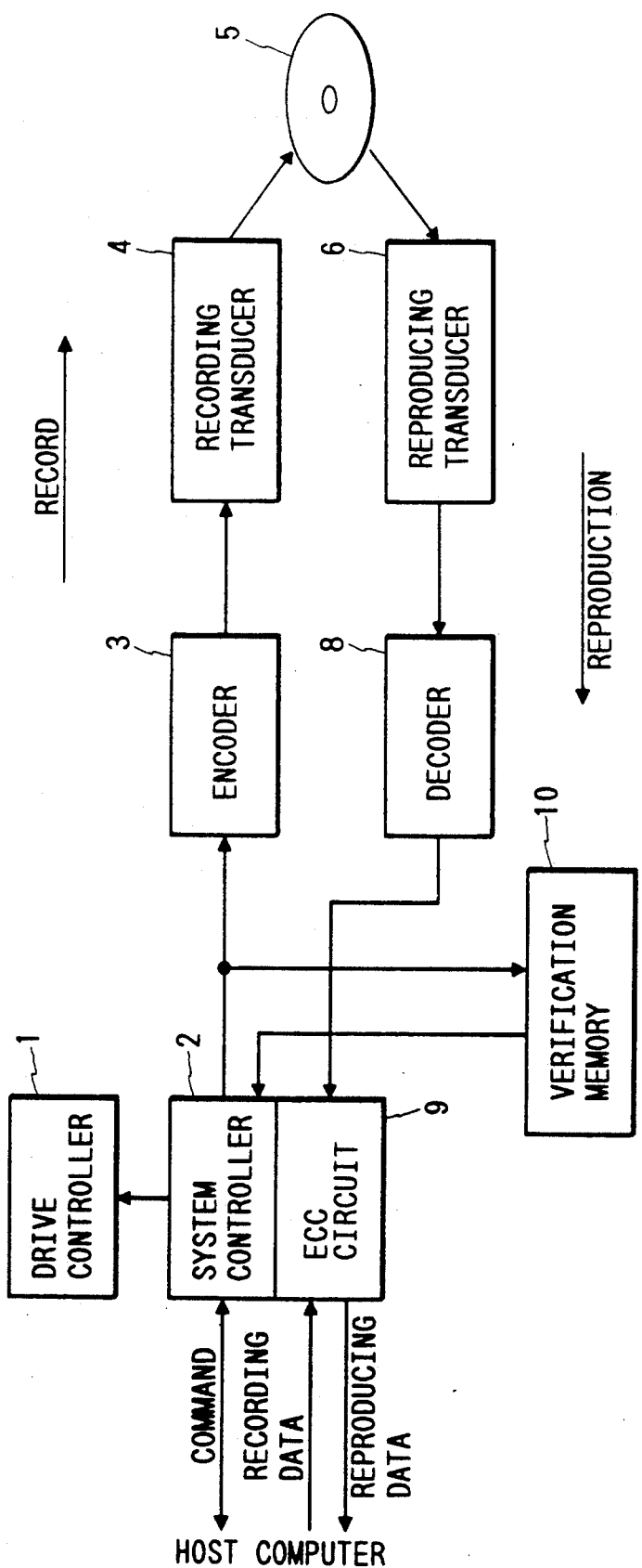
FIG. 1 shows a block diagram of a prior art information recording apparatus.
Figure 2:
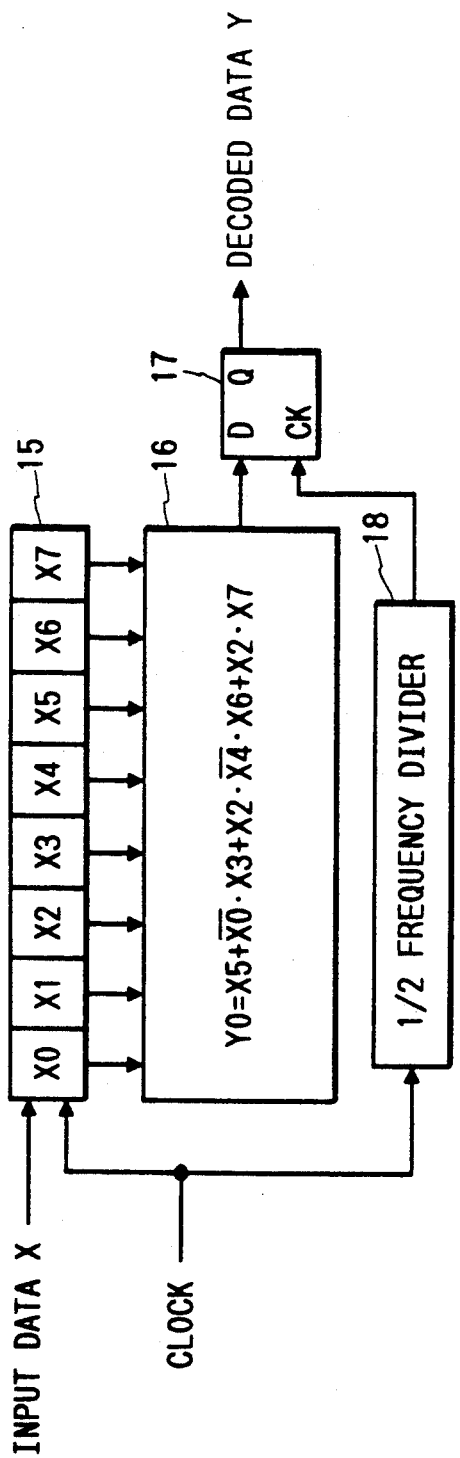
FIG. 2 shows a block diagram of a decoder used in the information recording apparatus of FIG. 1.
Figure 3:
FIG. 3 shows a schematic diagram of data having a synchronization pattern added thereto.
Figure 4:
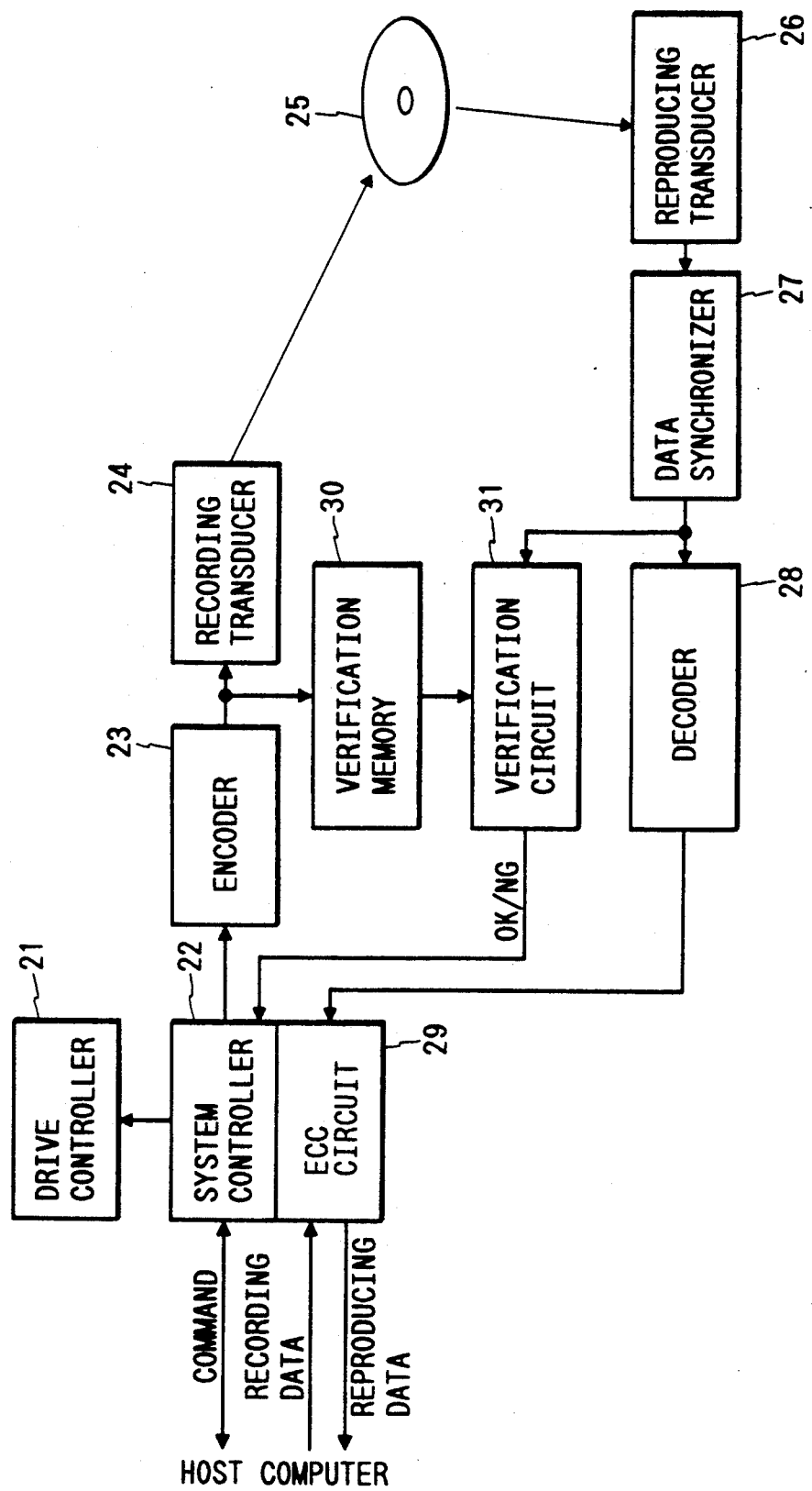
FIG. 4 shows a block diagram of a first embodiment of the information recording apparatus of the present invention.

FIG. 4 shows a block diagram of a first embodiment of the present invention. In FIG. 4, numeral 21 denotes a drive controller, numeral 22 denotes a system controller and numeral 29 denotes an ECC circuit. When a command to record information is issued from a host computer (not shown), the system controller 22 issues a command to the drive controller 21 to start the system. Data to be recorded which has been sent from the host computer has the ECC added thereto by the ECC circuit 29 and is sent to an encoder 23. The encoder 23 converts the data to a recording code such as a 2-7 code. The encoded signal is recorded on a recording medium 25 such as a magnetic disk or an optical disk by a recording transducer 24. The encoded signal is also temporarily stored in a verification memory 30. The memory 30 is preferably a semiconductor memory such as an IC memory.

The signal recorded on the recording medium 25 is immediately read out by a reproducing transducer 26 and it is sent to a data synchronizer 27. The data synchronizer 27 includes a PLL circuit and a synchronization signal detector, and generates a synchronization signal based on the read signal. The read signal is compared with the signal stored in the memory 30 by a verification circuit 31 at a timing determined by the synchronization signal. If those signals are found to be equal in the comparison, the verification circuit 31 sends a signal ("OK" signal) indicating correct recording to the system controller 22, and the record operation is terminated. On the other hand, if there is an inconsistent bit (error) between those signals, the verification circuit 31 sends a signal ("NO" or error signal) indicating an error to the system controller 22. When the system controller 22 receives the NG signal, it carries out error processing such as re-recording of the information. A counter for counting the number of errors may be provided in the verification circuit 31 so that the NG signal is issued when the number of errors exceeds a predetermined count.

In the reproducing mode of the information, the signal read from the medium 25 by the reproducing transducer 26 is supplied to a decoder 28 through the data synchronizer 27. The decoder 28 decodes the signal and sends the decoded signal to the ECC circuit 29. The ECC circuit 29 corrects errors by the ECC added to the data and reproduces the data. The reproduced data is sent to the host computer.

In the present embodiment, the encoded signal is stored and the signal read from the medium is compared with the stored signal for verification prior to the decoding. Accordingly, an error which may be corrected by the decoder can be detected and a quality control of the data recording can be performed to a high (strict) standard.

In the present embodiment, the recording transducer 24 and the reproducing transducer 26 may be magnetic heads or optical heads depending on the type of medium. A single transducer may be shared for recording and reproducing.

In the present embodiment, the recorded data is verified. An embodiment which verifies a synchronization pattern added to the data is now explained.

Figure 5:
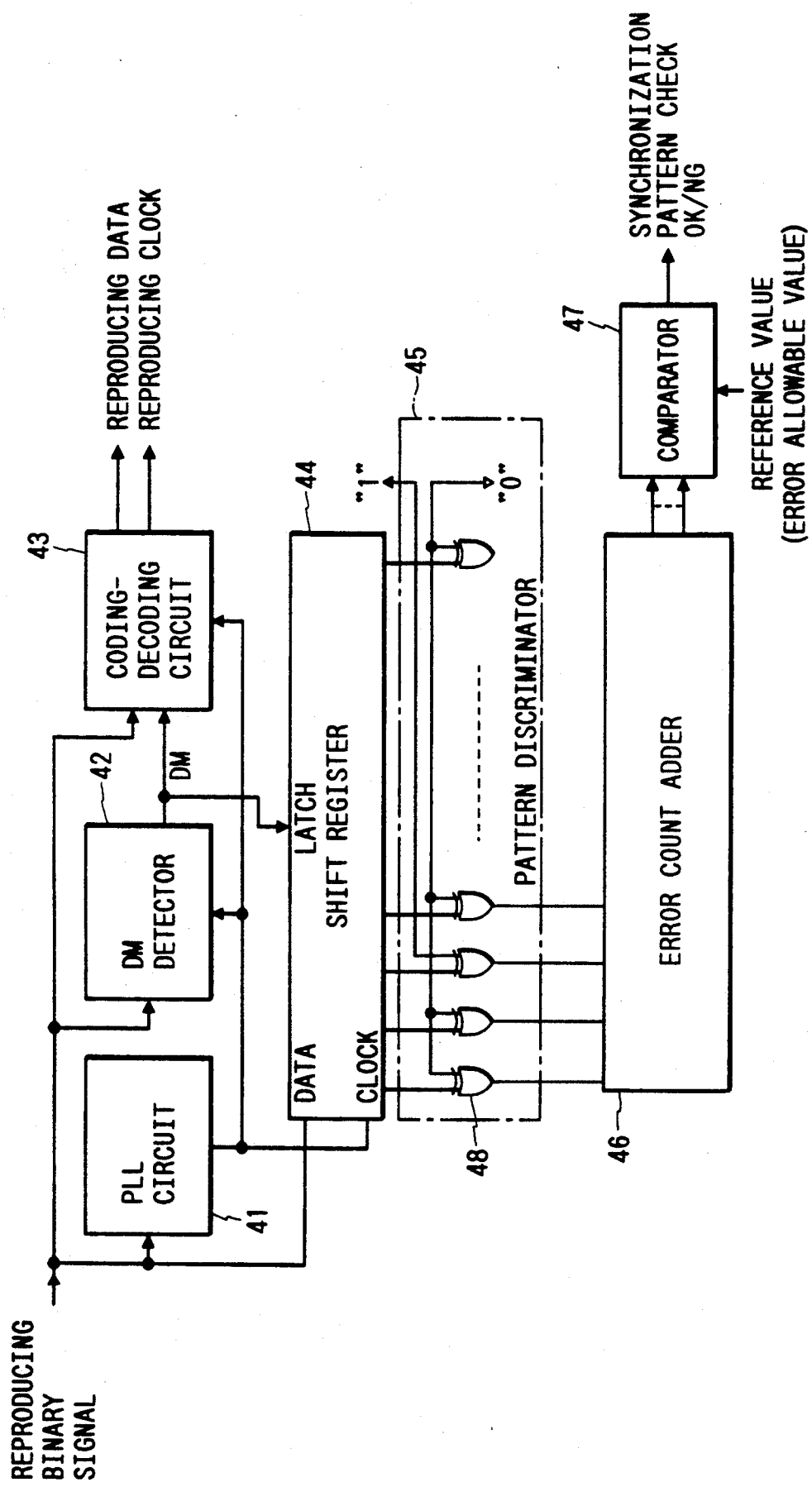
FIG. 5 shows a block diagram of a signal processor used in a second embodiment of the information recording apparatus of the present invention.

FIG. 5 shows a block diagram of a signal processor used in a second embodiment of the present invention. FIG. 5 shows a decoder and a verification circuit, and other portions are similar to those of the apparatus of FIG. 4.

In FIG. 5, a shift register 44 serial-parallel-converts the reproduced binary signal supplied from the reproducing transducer. On the other hand, a data mark (DM) included in the reproduced binary signal is detected by a DM detector 42. The shift register 44 is latched by the detection signal of the DM detector 42. Accordingly, a synchronization pattern added to the data is supplied to the shift register 44 for each data unit.

The synchronization pattern in the shift register 44 is supplied to one terminal of several each of exclusive OR gates 48 provided in parallel in a pattern discriminator 45, one for each bit. The other terminal of each of the gate 48 receives either "1" or "0" digit in accordance with the correct arrangement of the synchronization pattern. The synchronization pattern read from the medium is checked for correctness by the pattern discriminator 45, and a digit "1" is produced for an error bit and a digit "0" is produced for a correct bit. The output is supplied to an error count adder 46 which sends a total number of errors to a comparator 47. The comparator 47 compares the input number of error bits with a predetermined reference count, which a set to a maximum permissible value for the error. Thus, if the number of error bits is smaller than the reference count, the comparator 47 produces an OK signal indicating correct recording. On the other hand, when the number of error bits is larger than the reference count, the comparator 47 produces an NG signal indicating a recording error. The OK signal or NG signal is sent to the system controller as in the embodiment of FIG. 4. When the controller receives the NG signal, it instructs re-recording of the data.

In the circuit of FIG. 5, the decoder 43 reproduces the data and the clock based on the input reproduced binary signal. The PLL circuit 41 pulls in the PLL in accordance with the synchronization pattern added to the data to generate the clock. The shift register 44 and the decoder 43 are driven in synchronism with the clock signal.

Figure 6:
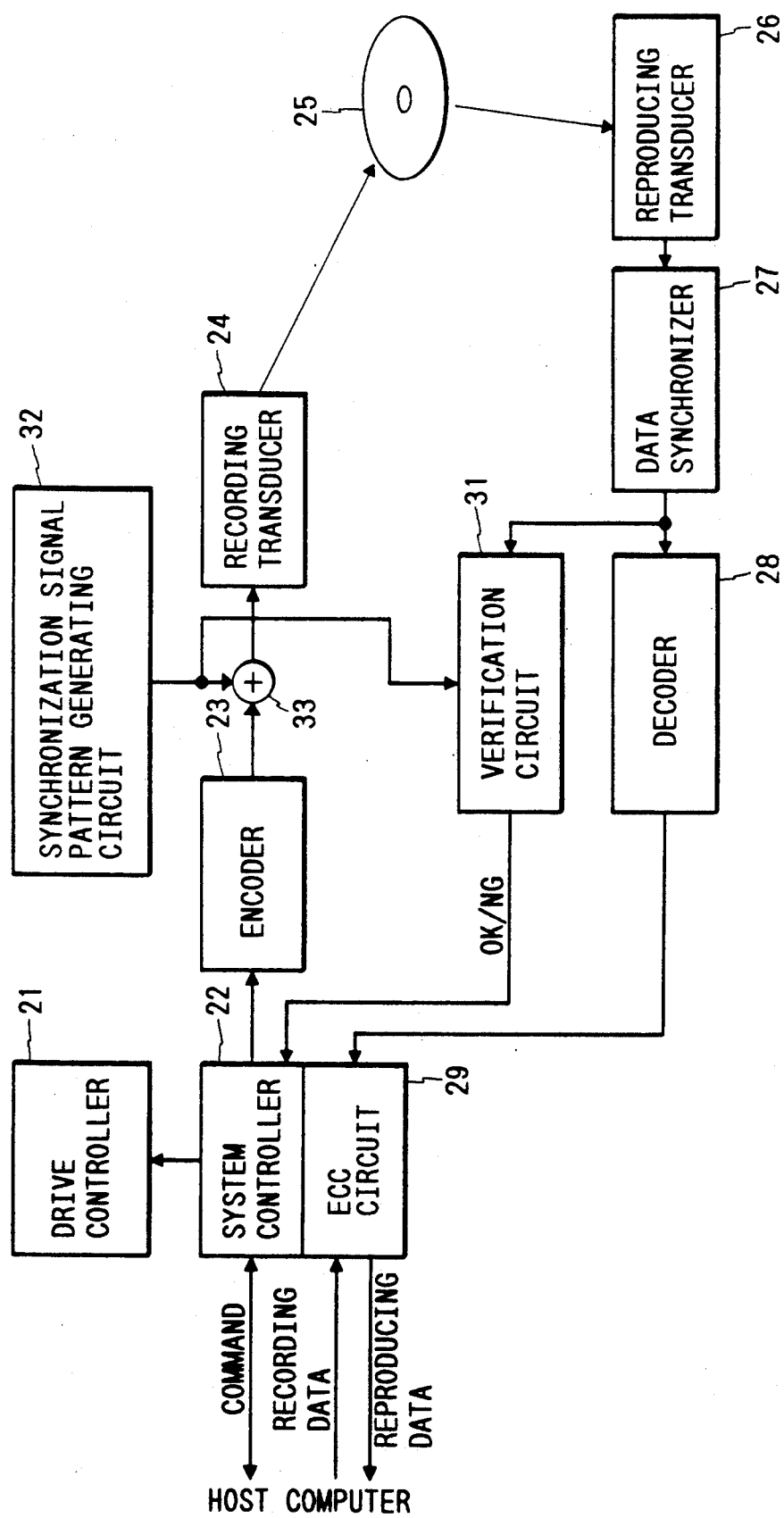
FIG. 6 shows a block diagram of a third embodiment of the information recording apparatus of the present invention.

FIG. 6 shows a block diagram of a third embodiment of the present invention which verifies the synchronization pattern. In FIG. 6, like elements to those shown in FIG. 4 are designated by the like numerals and explanation thereof is omitted.

The synchronization signal in the present embodiment includes a pattern which cannot be encoded together with the data signal. The synchronization signal having the predetermined pattern is generated by a synchronization signal pattern generator 32. The synchronization signal is added to the encoded data supplied from the encoder 23, by an adder 33. The synchronization signal is recorded on the recording medium 25, together with the data, by the recording transducer 24.

The synchronization signal recorded on the medium 25 is read by the reproducing transducer 26 together with the data, and it is supplied to the verification circuit 31 through the data synchronizer 27. The verification circuit 31 compares the pattern of the synchronization signal read from the medium with the predetermined pattern signal sent from the synchronization signal pattern generator 32 to detect an error. It also sends an OK signal or an NG signal to the system controller 22 depending on the number of errors as it does in the embodiment of FIG. 5.

Figure 7:
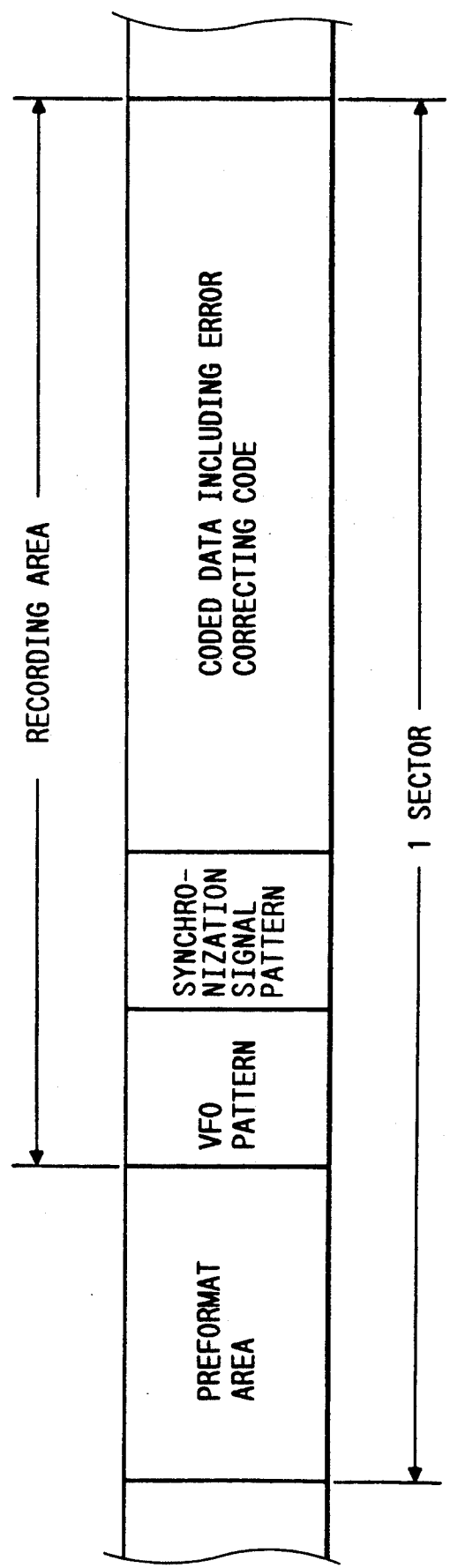
FIG. 7 shows a sector format on a recording medium.

An embodiment which verifies both the synchronization signal and the data is now explained. In the present embodiment, a sector on the recording medium has a format shown in FIG. 7. In FIG. 7, one sector comprises a preformatted area pre-formed on the medium and a record area recorded by the recording transducer. The record area comprises a VFO pattern, a synchronization signal pattern and coded data including the ECC. The synchronization signal pattern is a data mark (DM) in the present embodiment.

Figure 8:
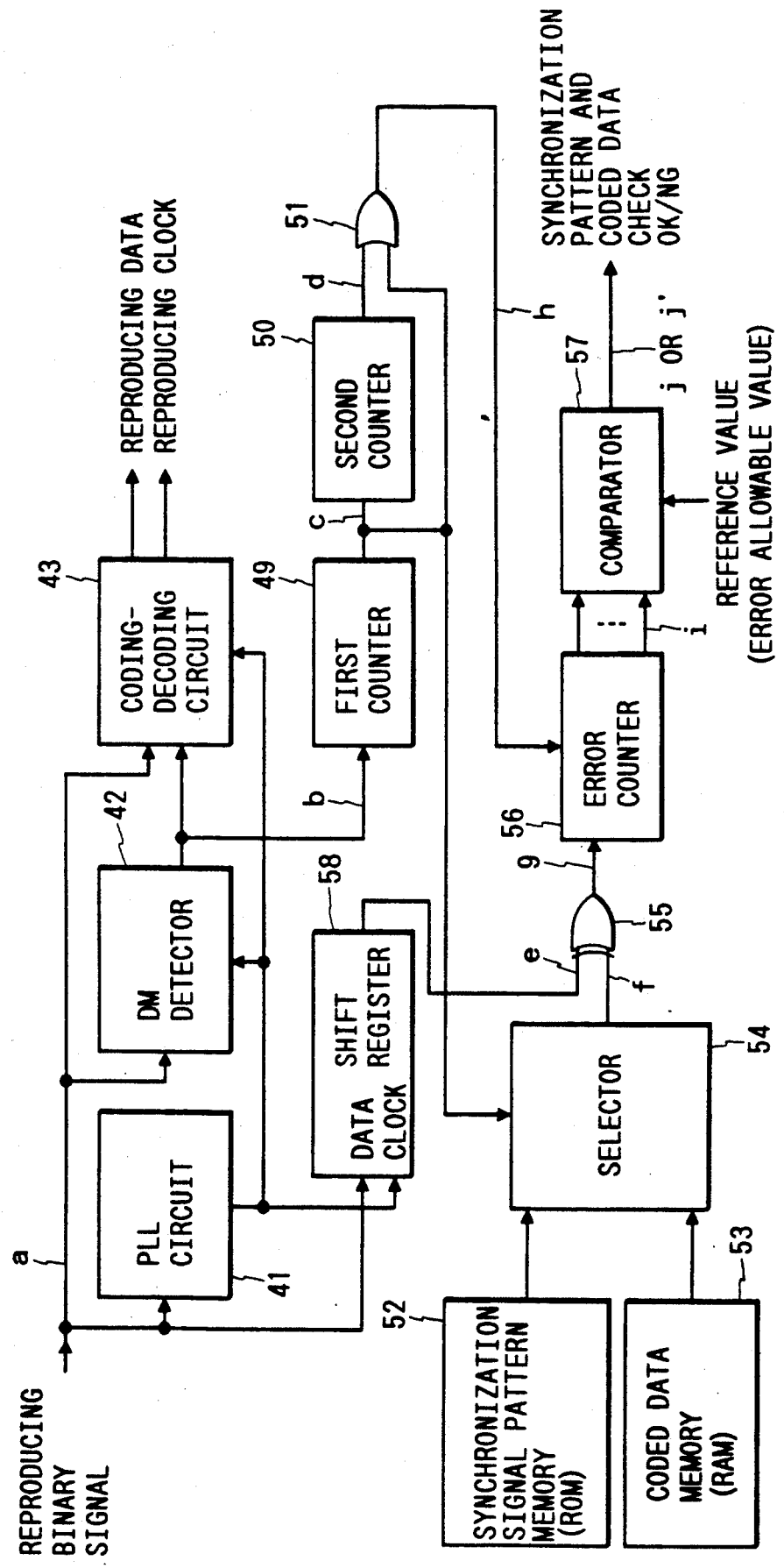
FIG. 8 shows a block diagram of a signal processor used in a fourth embodiment of the information recording apparatus of the present invention, and FIGS. 9a–9j' show waveforms of signals at various points in the circuit of FIG. 8.

FIG. 8 shows a block diagram of a signal processor used in a fourth embodiment of the present invention which verifies the synchronization pattern and the data. FIG. 8 shows a decoder and a verification circuit, and other portions are similar to those of the apparatus of FIG. 4. In FIG. 8, like elements to those of FIG. 5 are designated by like numerals and explanation thereof is omitted. FIGS. 9a–9j' show signals at various points in the circuit of FIG. 8 (specifically, on the lines designated by the symbols a to j'.

In FIG. 8, a signal shown in FIG. 9a is applied to a shift register 58 from the reproducing transducer. This signal is delayed by a predetermined time period as shown in FIG. 9e and the delayed signal is applied to an exclusive OR gate 55. The gate 55 compares the signal e with the signal supplied from the selector 54 to detect an error. The selector 54 selectively supplies the signal stored in the synchronization signal pattern memory 52 and the signal stored in the coded data memory 53 to the gate 55. The memory 52 is a read-only memory (ROM) which stores the synchronization signal having a predetermined pattern. On the other hand, the memory 53 is a random access memory (RAM) which stores the coded data supplied from the encoder in the record mode. The selector 54 is controlled to send to the gate 55 the output of the memory 52 when the synchronization signal is produced from the shift register 58, and the output of the memory 53 when the data is produced. Thus, the synchronization signal read from the medium is compared with the ROM output, and the data is compared with the RAM output to detect an error, as shown in FIG. 9f.

The selector circuit 54 is controlled in the following manner. A signal a is applied to the DM detector 42 and a detection signal for a start position of the DM is produced as shown in FIG. 9b. The signal b is sent to a first counter 49. The first counter 49 starts to count the clock generated by the PLL circuit 41 in response to the signal b and counts up a predetermined number of clocks to generate a gate signal having a duration corresponding to the DM area, as shown in FIG. 9c. The gate signal c is sent to the selector 54. When the signal c is of high level, the selector 54 sends the output signal of the memory 52 to the gate 55, and when the signal c is of low level, it sends the output signal of the memory 53 to the gate 55.

The signal c is also applied to a second counter 50. The second counter 50 starts to count the clock generated by the PLL circuit 41 at the fall of the signal c and counts up a predetermined number of clocks to generate a gate signal having a duration corresponding to the coded data area as shown in FIG. 9d. The signal d and the signal c are applied to an OR gate 51. The gate 51 sends a gate signal having a duration corresponding to the record area to an error counter 56 as shown in FIG. 9h.

The error counter 56 counts the number of error pulses shown in FIG. 9g which are sent from the gate 55, within the period defined by the signal h. When the signal h falls, the counter 56 holds the count as shown in FIG. 9i and sends the count to a comparator 57. The comparator 57 compares the number of errors counted by the counter with a predetermined reference count (maximum permissible value for error) and sends a result to the system controller (not shown) as shown in FIG. 9j or 9j'. The signal j is produced when the recording is normal, and it is of low level. On the other hand, if the read signal (synchronization signal and data) includes more errors than the permissible level, the signal j' which is of high level at the end of the verification is produced. When the system controller receives the signal j', it carries out error processing such as re-recording of the data.

In the embodiments shown in FIGS. 5 to 9a–9j', the synchronization signal recorded on the medium is directly verified. Accordingly, even a small recording error can be detected without failure and the inability of data reproduction is prevented.

The present invention may be applied in various ways other than those described above. For example, the verification circuit is not limited to that shown in the embodiments but any configuration which performs the same function may be used. The present invention includes all such modification without departing from the scope of the claims.

What is claimed is:

1. A method for recording information, comprising the steps of:

converting, under a predetermined converting rule, a first signal constituted by binary data of plural bits into a second signal constituted by binary data of plural bits whose bit-pattern is different from a bit-pattern of the first signal;

memorizing the second signal in a memory;

recording the second signal in a recording medium;

reading the second signal which has been recorded in the recording medium;

comparing each bit of the read-out second signal with a respective corresponding bit of the second signal memorized in the memory, thereby detecting bits having different values from each other; and outputting an error signal when a number of bits detected in said comparing step as having different values in the read-out second signal and the memorized second signal exceeds a predetermined number.

2. A method for recording information according to claim 1, further comprising the step of re-recording the second signal, as obtained from the first signal in said converting step, into the recording medium when the signal is output.

3. A method for recording information according to claim 1, further comprising the step of reconverting the second signal read-out from the recording medium to a third signal, using the predetermined converting rule, such that the third signal is in the absence of errors equal to the first signal.

4. An information recording apparatus, comprising:
an encoding circuit for converting, under a predetermined converting rule, a first signal constituted by binary data of plural bits into a second signal constituted by binary data of plural bits whose bit-pattern is different from a bit-pattern of said first signal;
a memory for memorizing the second signal converted by said encoding circuit;
a recording transducer for recording the second signal converted by said encoding circuit in a recording medium;
a reproducing transducer for reading the second signal form said recording medium;
an error detection circuit for comparing each of the second signal read out by said reproducing transducer with each bit of the second signal memorized in said memory, thereby detecting bits having different values form each other; and
an outputting circuit for outputting an error signal when a number of bits having different values detected by said error detection circuit exceeds a predetermined number.

5. An information recording apparatus according to claim 4, further comprising a controller for indicating re-recording of the second signal to said recording transducer upon receipt of an error signal from said outputting circuit.

6. An information recording apparatus according to claim 4, further comprising a decoding circuit for converting the second signal read out by said reproduction circuit to the first signal, under the predetermined converting rule.

7. A method for recording information, comprising the steps of:
generating, by means of a synchronization signal generating circuit, a synchronization signal constituted by binary data of plural bits arranged in a predetermined bit-pattern;
adding the synchronization signal generated in said generating step to an information signal which is to be recorded;
recording in a recording medium the information signal to which the synchronization signal has been added;
reading the synchronization signal and information signal from the recording medium;
separating the read-out signal into the synchronization signal and the information signal;
comparing each bit of the separated synchronization signal with a respective corresponding bit of the synchronization signal generated in said generating step, thereby detecting bits having different values from each other; and outputting an error signal when a number of bits detected as having different values exceeds a predetermined number.

8. Method for recording information according to claim 7, further comprising the step of re-recording the information signal to which the synchronization signal is added, when the error signal is output.

9. Method for recording information according to claim 7, further comprising the step of reproducing the recording medium, by using the separated synchronization signal.

10. An information recording apparatus, comprising:
a synchronization signal generating circuit for generating a synchronization signal constituted by binary data of plural bits which is arranged in a predetermined bit-pattern;
a signal-adding circuit for adding the synchronization signal generated by said synchronization signal generating circuit to an information signal which is to be recorded;
a recording transducer for recording, in a recording medium, the information signal to which the synchronization signal has been added by said signal adding circuit;
a reproduction transducer for reading the synchronization signal and information signal from the recording medium;
a signal-separation circuit for separating the synchronization signal and the information signal read out by said reproduction transducer;
an error detection circuit for comparing each bit of the synchronization signal separated by said signal separation circuit with each bit of the synchronization signal generated by said synchronization signal generation circuit, thereby detecting bits having different values from each other; and
an outputting circuit for outputting an error signal when a number of bits having different values detected by said error detection circuit exceeds a predetermined number.

11. An information recording apparatus according to claim 10, wherein said outputting circuit includes a counter for counting the number of bits whose values are different from each other, detected by said error detection circuit, and a circuit for comparing a counter value of said counter with the said predetermined number.

12. An information recording apparatus according to claim 10, further comprising a decoding circuit for reproducing the information signal from the signal read out by said reproduction transducer by using the synchronization signal generated by said signal separation circuit.

13. An information recording apparatus, comprising:
an encoding circuit for converting, under a predetermined converting rule, a first signal constituted by binary data of plural bits into a second signal constituted by binary data of plural bits whose bit-pattern is different from the bit-pattern of said first signal;
a synchronization signal generating circuit for generating a synchronization signal constituted by binary data of plural bits arranged in a predetermined bit-pattern;
a signal-adding circuit for adding the synchronization signal generated by said synchronization signal generating circuit to the second signal converted by said encoding circuit;

a recording transducer for recording, in a recording medium, the second signal to which the synchronization signal has been added by said signal-adding circuit;

a reproduction transducer for reading the synchronization signal and second signal form the recording medium;

a signal-separation circuit for separating the synchronization signal from the information signal read out by said reproduction transducer;

an error detection circuit for comparing each bit of the synchronization signal separated by said signal-separation circuit with a respective corresponding bit of synchronization signal generated by said synchronization signal generation circuit, thereby detecting bits having different values from each other; and an outputting circuit for outputting an error signal when a number of bits having different values detected by said error detection circuit exceeds a predetermined number.

14. An information recording apparatus according to claim 13, further comprising a controller for indicating that the synchronization signal and the second information signal are to be re-recorded in the recording medium when the error signal is output.

15. An information recording apparatus according to claim 13, further comprising an encoding circuit for reproducing the information signal form the signal read out by said production transducer by using the synchronization signal separated by said signal separation circuit.

16. A method for recording information, comprising the steps of:

converting, under a predetermined converting rule, a first signal constituted by binary data of plural bits into a second signal constituted by binary data of plural bits whose bit-pattern is different from a bit-pattern of the first signal;

memorizing the converted second signal in a memory;

adding to the converted second signal a synchronization signal constituted by binary data of plural bits which is arranged in a predetermined bit-pattern generated by a synchronization signal generating circuit;

recording the converted second signal to which the synchronization signal has been added, in a recording medium;

reading the second signal and synchronization signal from the recording medium;

separating the read-out signal into the synchronization signal and the second signal;

comparing each bit of the separated synchronization signal with a respective corresponding bit of the synchronization signal generated by the synchronization signal generation circuit, thereby detecting bits having different values from each other;

comparing each bit of the separated second signal with a respective corresponding bit of the second signal memorized in the memory, thereby detecting bits having different values from each other; and outputting an error signal when a number of bits detected in said comparing steps as having different values exceeds a predetermined number.

17. A method for recording information according to claim 16, further comprising the step of re-recording in the recording medium the synchronization signal and the second signal when the error signal is output.

18. A method for recording information according to claim 16, further comprising the step of converting the second signal separated by the synchronization signal, under predetermined conversion rule, into a third signal which in the absence of errors is equal to the first signal.

19. An information recording apparatus, comprising:

an encoding circuit for converting, under a predetermined converting rule, a first signal constituted by binary data of plural bits into a second signal constituted by binary data of plural bits whose bit-pattern is different from bit-pattern of the first signal;

a memory for memorizing the second signal converted by said encoding circuit;

a synchronization signal generating circuit for generating a synchronization signal constituted by binary data of plural bits arranged in a predetermined bit-pattern;

a signal-adding circuit for adding the synchronization signal generated by said synchronization signal generating circuit to the second signal converted by said encoding circuit;

a recording transducer for recording, in a recording medium, the second signal to which the synchronization signal has been added by said signal adding circuit;

a reproduction transducer for reading the synchronization signal and second signal from said recording medium;

an error detection circuit for comparing each bit of the synchronization signal and the second signal with a respective corresponding bit of a reference signal, thereby detecting bits having different values from each other;

a selector circuit for selectively transmitting the second signal memorized in said memory and the synchronization signal generated by said synchronization signal generating circuit to said error detection circuit as the reference signal; and an outputting circuit for outputting an error signal when a number of bits having different values detected by said error detection circuit exceeds a predetermined number.

20. An information recording apparatus according to claim 19, wherein said outputting circuit includes a counter for counting, for a predetermined amount of the synchronization signal, and the second signal, the number of bits having different value detected by said error detection circuit and comparing circuit, for comparing the counted value counted by said counter with said predetermined number.

21. An information recording apparatus according to claim 19, further comprising means for converting, under a predetermined conversion rule, the second signal read out by said reproduction transducer into the first signal.

* * * * *

UNITED STATES PATENT AND TRADEMARK OFFICE
CERTIFICATE OF CORRECTION

PATENT NO. : 5,175,655

DATED : December 29, 1992

INVENTOR(S) : SEIICHIRO SATOMURA

It is certified that error appears in the above-identified patent and that said Letters Patent is hereby corrected as shown below:

IN [57] ABSTRACT

Line 1, "In" should read --In a--.
Line 3, "closed" should read --coded--.

COLUMN 1

Line 41, "recording" should read --actual recording--.
Line 53, "2-7 cord" should read --2-7 code--.

COLUMN 2

Line 11, "errors" should read --error--.

COLUMN 3

Line 58, "("NO"" should read --("NG"--.

COLUMN 4

Line 10, "a" should be deleted.
Line 35, "several each of" should read --each of several--.
Line 38, "gate 48" should read --gates 48--.
Line 48, "a set" should read --is set--.

COLUMN 5

Line 42, "j'." should read --j').--.

UNITED STATES PATENT AND TRADEMARK OFFICE
CERTIFICATE OF CORRECTION

PATENT NO. : 5,175,655
DATED : December 29, 1992
INVENTOR(S) : SEIICHIRO SATOMURA It is certified that error appears in the above-identified patent and that said Letters Patent is hereby corrected as shown below:

COLUMN 6

Line 48, "modification" should read --modifications--.

COLUMN 7

Line 27, "form" should read --from--.
Line 32, "form" should read --from--.

COLUMN 8

Line 23, "said signal" should read --said signal- --.
Line 52, "signal separation" should read --signal-separation--.

COLUMN 9

Line 6, "form" should read --from--.
Line 14, "synchronization" should read --the synchronization--.
Line 29, "form" should read --from--.

COLUMN 10

Line 18, "bit-pattern" should read --a bit-pattern--.
Line 31, "signal adding" should read --signal-adding--.

UNITED STATES PATENT AND TRADEMARK OFFICE
CERTIFICATE OF CORRECTION

PATENT NO. : 5,175,655
DATED : December 29, 1992
INVENTOR(S) : SEIICHIRO SATOMURA It is certified that error appears in the above-identified patent and that said Letters Patent is hereby corrected as shown below:

COLUMN 10

Line 54, "value" should read --values--.

Signed and Sealed this

Thirtieth Day of November, 1993

Attest:

BRUCE LEHMAN

Attesting Officer    Commissioner of Patents and Trademarks